US012617037B2

(12) United States Patent 
Müller et al.

(10) Patent No.: US 12,617,037 B2 
(45) Date of Patent: May 5, 2026

(54) ULTRASONIC WELDING DEVICE COMPRISING A SONOTRODE CARRIER AND A SONOTRODE FASTENED THERETO

(71) Applicant: SCHUNK SONOSYSTEMS GMBH, Wettenberg (DE)

(72) Inventors: Stefan Müller, Wetzlar (DE); Valentin Muela, Solms (DE)

(73) Assignee: SCHUNK SONOSYSTEMS GMBH, Wettenberg (DE)

( * ) Notice: Subject to any disclaimer, the term of this patent is extended or adjusted under 35 U.S.C. 154(b) by 12 days.

(21) Appl. No.: 18/709,910

(22) PCT Filed: Dec. 16, 2021

(86) PCT No.: PCT/EP2021/086319 
§ 371 (c)(1), 
(2) Date: May 14, 2024

(87) PCT Pub. No.: WO2023/110109 
PCT Pub. Date: Jun. 22, 2023

(65) Prior Publication Data 
US 2025/0018499 A1 Jan. 16, 2025

(51) Int. Cl. 
*B23K 20/00* (2006.01) 
*B23K 20/10* (2006.01)

(52) U.S. Cl. 
CPC ............ *B23K 20/106* (2013.01); *B23K 20/10* (2013.01)

(58) Field of Classification Search 
CPC .. B23K 20/106; B23K 20/10; B23K 37/0241; B23K 1/06; B23K 37/04 
See application file for complete search history.

(56) References Cited

U.S. PATENT DOCUMENTS

| | | | | | |
|---|---|---|---|---|---|
| 3,497,941 | A | * | 3/1970 | Moll | H01H 11/041 |
| | | | | | 228/124.1 |
| 3,750,926 | A | * | 8/1973 | Sakamoto | B29C 66/81433 |
| | | | | | 228/110.1 |
| 4,582,239 | A | * | 4/1986 | Scotto | B23K 20/106 |
| | | | | | 156/580.2 |
| 5,147,082 | A | * | 9/1992 | Krause | B23K 20/106 |
| | | | | | 228/110.1 |

(Continued)

FOREIGN PATENT DOCUMENTS

| | | |
|---|---|---|
| CN | 101577218 A | 11/2009 |
| CN | 1757477 B | 5/2010 |

(Continued)

OTHER PUBLICATIONS

Computer English Translation of DE10330431B3 (Year: 2005).*

(Continued)

*Primary Examiner* — Erin B Saad 
(74) *Attorney, Agent, or Firm* — Maier & Maier, PLLC

(57) ABSTRACT

An ultrasonic welding device comprises a sonotrode and a sonotrode carrier which is formed to cause ultrasonic vibrations of the sonotrode. The sonotrode and the sonotrode carrier have in each case a contact face, wherein at least one of the contact faces is roughened at least in sections. The sonotrode is fastened exchangeably to the sonotrode carrier in such a manner that the contact faces are pushed against one another.

11 Claims, 4 Drawing Sheets

(56) References Cited

U.S. PATENT DOCUMENTS

| | | | | |
|---|---|---|---|---|
| 5,816,472 | A * | 10/1998 | Linn | B23K 20/004 |
| | | | | 228/1.1 |
| 5,820,011 | A * | 10/1998 | Ito | B26D 7/086 |
| | | | | 156/580.2 |
| 5,829,663 | A * | 11/1998 | Khelemsky | B23K 20/005 |
| | | | | 228/904 |
| 5,921,457 | A * | 7/1999 | Patrikios | B23K 20/106 |
| | | | | 228/1.1 |
| 6,045,026 | A * | 4/2000 | Hembree | B23K 20/10 |
| | | | | 228/110.1 |
| 6,089,438 | A * | 7/2000 | Suzuki | B23K 20/106 |
| | | | | 156/580.2 |
| 6,523,732 | B1 * | 2/2003 | Popoola | B23K 20/106 |
| | | | | 228/110.1 |
| 6,691,909 | B2 * | 2/2004 | Skogsmo | B23K 20/106 |
| | | | | 228/111.5 |
| 7,219,419 | B2 * | 5/2007 | Higashi | H10P 72/0446 |
| | | | | 451/163 |
| 7,789,284 | B2 * | 9/2010 | Ebihara | B23K 20/10 |
| | | | | 228/110.1 |
| 9,248,520 | B2 * | 2/2016 | Lang | B23K 20/106 |
| 2003/0066862 | A1 * | 4/2003 | Popoola | B23K 20/10 |
| | | | | 228/110.1 |
| 2005/0199676 | A1 | 9/2005 | Stroh et al. | |
| 2006/0231585 | A1 | 10/2006 | Dieterle | |
| 2009/0265924 | A1 * | 10/2009 | Ebihara | H05K 13/046 |
| | | | | 29/739 |
| 2009/0277951 | A1 | 11/2009 | Ebihara et al. | |
| 2010/0276061 | A1 * | 11/2010 | Oblak | B29C 66/9241 |
| | | | | 156/73.1 |
| 2011/0101074 | A1 * | 5/2011 | Storm | B23K 20/106 |
| | | | | 228/103 |
| 2012/0158168 | A1 * | 6/2012 | Khakhalev | B23K 20/24 |
| | | | | 700/108 |
| 2015/0158247 | A1 * | 6/2015 | Heeg | B29C 66/43 |
| | | | | 156/73.1 |
| 2020/0269347 | A1 * | 8/2020 | Mueller | B23K 20/10 |
| 2021/0154948 | A1 * | 5/2021 | Mueller | B29C 65/08 |
| 2022/0072651 | A1 * | 3/2022 | Aust | B23K 37/0241 |
| 2022/0281028 | A1 * | 9/2022 | Trube | B23K 20/10 |

FOREIGN PATENT DOCUMENTS

| | | |
|---|---|---|
| DE | 10330431 B3 | 1/2005 |
| JP | 2010274296 A | 12/2010 |
| JP | 2018089634 A | 6/2018 |

OTHER PUBLICATIONS

International Search Report and Written Opinion issued on Aug. 11, 2022, in corresponding International Application No. PCT/EP2021/086319, 14 pages.

* cited by examiner

ULTRASONIC WELDING DEVICE COMPRISING A SONOTRODE CARRIER AND A SONOTRODE FASTENED THERETO

FIELD

The present invention relates to an ultrasonic welding device. The invention furthermore relates to a method for producing a sonotrode for such an ultrasonic welding device and a method for producing a sonotrode carrier for such an ultrasonic welding device.

BACKGROUND

Ultrasonic welding devices generally comprise a sonotrode carrier to which a sonotrode may be exchangeably fastened. Ultrasonic vibrations of the sonotrode may be brought about by means of the sonotrode carrier, the energy of which vibrations may then be transmitted via the sonotrode to a workpiece to be welded. Depending on the application, the sonotrode carrier may be combined with different types of sonotrodes, such as, for example, for spot or roll seam welding or sonotrodes in the form of a flexural resonator which may also be used at points which are difficult to access (only to mention a few examples).

The sonotrode may be screwed to the sonotrode carrier, for example, via one or more screws. Deviating tightening torques of the screw(s), for example, as a result of the use of incorrect tools or as a result of dirty or defective coupling faces, may significantly influence the vibration properties of the sonotrode and thus the welding properties of the ultrasonic welding device. An insufficient clamping force may lead, for example, to the sonotrode rotating during welding operation and/or being excessively deformed in the region of the coupling faces, which may have a negative effect on the welding result. In a worst case, the sonotrode and/or the screw(s) may break.

SUMMARY

There may therefore be a need for an ultrasonic welding device which enables improved fastening of a sonotrode to a sonotrode carrier.

There may furthermore be a need for a method for producing a correspondingly improved sonotrode.

Not least, there may be a need for a method for producing a correspondingly improved sonotrode carrier.

A first aspect of the invention relates to an ultrasonic welding device according to claim 1. The ultrasonic welding device comprises at least one sonotrode and a sonotrode carrier which is formed to cause ultrasonic vibrations of the sonotrode. The sonotrode and the sonotrode carrier have in each case a contact face, also referred to below as a coupling face. At least one of the contact faces is roughened at least in sections. The sonotrode is fastened exchangeably to the sonotrode carrier in such a manner that the contact faces are pushed against one another.

A second aspect of the invention relates to a method for producing a sonotrode for an ultrasonic welding device, as is described above and below. The method comprises at least one step of providing the sonotrode in a state to be processed and a step for processing the sonotrode in order to roughen the contact face of the sonotrode at least in sections.

A third aspect of the invention relates to a method for producing a sonotrode carrier for an ultrasonic welding device, as is described above and below. The method comprises at least one step of providing the sonotrode carrier in a state to be processed and a step of processing the sonotrode carrier in order to roughen the contact face of the sonotrode carrier at least in sections.

It should be pointed out that features of the ultrasonic welding device may also be understood as features of the methods described above and below and vice versa.

Without restricting the scope of the invention in any manner, embodiments of the invention may be regarded as being based on the concepts and findings described below.

As already mentioned, the connection between the sonotrode and the sonotrode carrier is decisive for the quality of the welding result. How good this connection is may depend on various influencing factors, for example, on whether the specified tightening torque of the screw(s) is adhered to, how clean the contact faces are, or on the production-specific surface properties of the contact faces.

The approach presented here thus makes it possible to make the connection between the sonotrode and the sonotrode carrier significantly less sensitive to contamination, for example, by oil or grease, to errors in the maintenance and mounting of the sonotrode and to fluctuations in the production of the relevant components, and indeed without undesirable notches being generated on the sonotrode and/or the sonotrode carrier. Such notches may, even if they are relatively small, given the high level of strain to which the sonotrode or the sonotrode carrier is exposed during welding operation, potentially lead to damage.

This is in principle achieved in that the friction between the sonotrode and the sonotrode carrier is increased by targeted roughening of one or both contact faces, or at least one section thereof, in a suitable manner. In other words, by corresponding roughening of the sonotrode and/or the sonotrode carrier using a suitable processing method, one or more roughened sections may be created within one or both contact faces which may hook together at the microscopic level with the corresponding counterpart, for example, one or more sections which have not been roughened and/or one or more sections of the counterpart which have also been correspondingly roughened. Such a micro-toothing ensures, during welding operation, a reliable connection between the sonotrode and the sonotrode carrier, and indeed without the clamping force with which the sonotrode and the sonotrode carrier are pushed against one another having to be increased.

It was possible to demonstrate this advantageous effect in tests in which a rotational force was measured which is required to rotate a sonotrode in the form of what is known as a flexural resonator (see further below) with respect to the sonotrode carrier.

The following parameters were used for the tests: Distance of the force application point for the rotational force from the center of the sonotrode: 78 mm; feed: 2 mm/min; tightening torque of the screws for fastening the sonotrode to the sonotrode carrier: 20 Nm. The introduction of force was performed perpendicular to the longitudinal axis of the sonotrode.

In this case, it was possible to increase the rotational force from approx. 550 N for a sonotrode with an unprocessed, i.e. not specially roughened contact face to approx. 800 N for a sonotrode with a contact face roughened by laser processing and even to 1150 N for a sonotrode with a contact face roughened by blasting with glass pearls. It was therefore possible to more than double the stability of the fastening while having the same tightening torque. All of the tested sonotrodes were unremarkable in terms of vibration characteristics.

The increase in the rotational force may be explained by virtue of the fact that, as a result of a defined structure within the contact face on the sonotrode and/or on the sonotrode carrier, a type of positive locking on a microscopic scale, i.e. a micro-toothing, is generated. The structure may be embodied so that it minimally penetrates into the corresponding counterpart, i.e. that the sonotrode and the sonotrode carrier do not touch at the contact face in a punctiform or linear manner, but rather in a superficial manner. The structure used for the micro-toothing and/or a surface, pressed together with the structure, of the counterpart may be slightly elastically and/or plastically deformed. Projecting edges or peaks of the structure generated by the roughening may penetrate slightly into material, which is close to the surface, of the counterpart and thus bring about the micro-toothing. The deformations may be only a few millimeters or even smaller, in particular significantly smaller than the structure generated by the roughening.

Some of the terms used above and below are explained in greater detail below.

The term contact face may be understood on one hand as a macroscopically flat surface section of the sonotrode on which the sonotrode has contact with the contact face of the sonotrode carrier. On the other hand, this may be understood as a macroscopically flat surface section of the sonotrode carrier on which the sonotrode carrier has contact with the contact face of the sonotrode. The two contact faces may be brought to cover one another by fastening the sonotrode to the sonotrode carrier and be pushed against one another with a defined clamping force.

It is possible that the sonotrode and the sonotrode carrier touch exclusively at their contact faces.

The contact face may be roughened in sections, i.e. in one or more coherent or separate sections. Alternatively, the entire contact face may be roughened, i.e. the roughened section may extend over the entire contact face.

The term roughened section may be understood in this context as a specially processed, for example, flat section of the contact face which, as a result of the special processing, has a significantly greater roughness than a section of the contact face which has not been processed in such a manner or another surface of the sonotrode and/or the sonotrode carrier. For this purpose, the contact face may, for example, have been processed using a mechanical, optical, electrical (e.g. erosion), electrochemical or chemical method for surface treatment or using at least two of these methods in combination. In other words, a special friction-increasing structure may be formed in the region of the contact face by the processing, wherein the friction-increasing properties of the structure may be the same in all directions, i.e. non-directed or isotropic, or different in different directions, i.e. directed or anisotropic. The roughness of such a roughened section of the contact face may differ quantitatively and/or qualitatively from the roughness of a section of the contact face which is not roughened in such a manner. The section which has not been roughened may be substantially smooth, wherein any microscopic unevennesses on the surface of this section may be caused by a production or processing method. For example, the non-roughened section may have a residual roughness which originates from machining of the relevant component and/or from grinding, sanding or polishing the relevant component. Such a residual roughness is generally anisotropic, i.e. the relevant section generally has a surface structure with a preferred direction which may correspond, for example, to a processing direction during machining, grinding, sanding or polishing. The roughness of the deliberately roughened section of the contact face may be significantly greater in comparison with the non-roughened section, for example, by a factor of 2, 5 or even 10. Moreover, techniques which generate an isotropic rough surface structure, i.e. without a preferred direction, such as, for example, laser irradiation, particle blasting, in particular glass ball blasting or sand blasting may be used for targeted roughening of the contact face.

The sonotrode carrier may comprise, for example, a converter and/or a booster. The sonotrode carrier may additionally comprise a generator. The sonotrode may be fastened to a free end of the (longitudinal) sonotrode carrier, for example, of the booster or the converter, in particular in such a manner that a vibration axis, along which the sonotrode carrier may be moved to and fro with frequencies in the ultrasonic range, stands perpendicular to the contact faces.

In specific embodiments, the sonotrode carrier may additionally comprise an intermediate piece which may be fastened on one hand to the booster or converter and to which on the other hand the sonotrode may be fastened.

The term converter may be understood as an electromechanical component which is formed to convert a high-frequency electric voltage provided by the generator into mechanical ultrasonic vibrations with a corresponding frequency in the ultrasonic range, for example, between 20 kHz and 100 kHz, preferably between 20 kHz and 35 kHz.

The booster, also referred to as a transmission or amplitude transformation piece, may be formed to change the ultrasonic vibrations provided by the converter in terms of their amplitude, i.e. reduce and/or increase the amplitude, and transmit the ultrasonic vibrations changed in such a manner to the sonotrode. The booster may additionally be formed to mount the sonotrode carrier in the ultrasonic welding device.

The term sonotrode may be understood as a tool which may be caused to perform correspondingly high-frequency resonance vibrations as a result of the introduction of ultrasonic vibrations and is formed to transmit these vibrations to one or more workpieces to be welded. For example, the sonotrode, in particular if it is embodied as a two-armed flexural resonator (see further below), may be formed to be symmetrical in relation to its longitudinal and/or transverse axis. Uneven strain on the sonotrode may thus be avoided.

According to one embodiment, the sonotrode may be fastened exchangeably to the sonotrode carrier via at least one screw. In this case, the screw may push the contact faces against one another. This enables a controlled pressing together of the contact faces. The replacement of the sonotrode may thus furthermore be simplified. The sonotrode may also be fastened exchangeably to the sonotrode carrier via two or more than two screws.

According to one embodiment, the screw may be introduced into a sonotrode opening in the sonotrode and the sonotrode opening may be surrounded at least partially by the contact face of the sonotrode. Additionally or alternatively, the screw may be introduced into a sonotrode carrier opening in the sonotrode carrier and the sonotrode carrier opening may be surrounded at least partially by the contact face of the sonotrode carrier. In other words, the screw may go transversely, in particular perpendicularly, through one or both contact faces. The frictional connection between the two contact faces may thus be improved.

According to one embodiment, the sonotrode opening may be surrounded in a ring-shaped and/or ring segment-shaped manner by the contact face of the sonotrode. Additionally or alternatively, the sonotrode carrier opening may be surrounded in a ring-shaped and/or ring segment-shaped manner by the contact face of the sonotrode carrier. This may simplify the orientation of the sonotrode with respect to the sonotrode carrier, in particular if the sonotrode is fastened to the sonotrode carrier via only one screw.

According to one embodiment, the sonotrode opening may be surrounded by at least one ring-shaped and/or ring segment-shaped roughened section of the contact face of the sonotrode. Additionally or alternatively, the sonotrode carrier opening may be surrounded by at least one ring-shaped and/or ring segment-shaped roughened section of the contact face of the sonotrode carrier. An unintentional rotation of the sonotrode relative to the sonotrode carrier during welding operation may be effectively avoided, in particular if the sonotrode is fastened to the sonotrode carrier via only one screw.

According to one embodiment, at least one of the contact faces may comprise a striped pattern composed of several stripe-shaped roughened sections. The stripe-shaped sections may be oriented in the same direction or in different directions. It is expedient if the stripe-shaped sections are distributed over the entire contact face, in particularly are evenly distributed. The striped pattern may be generated, for example, by laser processing of the sonotrode or the sonotrode carrier. It was possible to achieve particularly good results in tests with this embodiment.

According to one embodiment, the roughened sections of the striped pattern may be arranged parallel to one another. In this case, the roughened sections of the same contact face or different contact faces may be arranged parallel to one another. Each roughened section of the striped pattern may additionally run parallel to the longitudinal direction of the sonotrode. It was also possible to achieve particularly good results in tests with this embodiment.

A roughened section of the contact face which is roughened at least in sections has a roughness which is characterized in that an mean roughness depth $R_z$ of the roughened section is greater than 2.0 μm and/or an arithmetical mean roughness value $R_a$ of the roughened section is greater than 0.3 μm. Such lower thresholds have been shown to be particularly practical in tests.

The mean roughness depth $R_z$ is smaller than 14 μm. Additionally or alternatively, the arithmetical mean roughness value $R_a$ is smaller than 3.0 μm. Such upper thresholds have been shown to be particularly practical in tests.

For example, the following roughness values were measured in tests:

for a section of the contact face roughened by blasting with glass pearls: 0.53 μm for $R_a$; 3.29 μm for $R_z$;
  for a section of the contact face roughened by laser treatment: 2.43 μm for $R_a$; 13.27 μm for $R_z$;
  for an unroughened, i.e. untreated or only polished section of the contact face: 0.16 μm for $R_a$; 0.90 μm for $R_z$.

The sonotrode is embodied as a flexural resonator which comprises a base body and at least one bending arm which projects from the base body. The sonotrode may be fastened exchangeably to the sonotrode carrier via the base body and the base body may comprise the contact face of the sonotrode. This has the effect that the sonotrode is excited to perform transversal vibrations, i.e. is elastically deformed in a wavy line shape in the vibrating state. In this case, the sonotrode may have several points, also referred to as zero crossings, at which their deflection relative to an imaginary zero line is zero or negligibly small. This embodiment makes it possible to weld even workpieces which are difficult to access.

It is possible that the base body represents the widest part of the sonotrode, while the bending arm may at least in sections be embodied to be significantly narrower and/or thinner than the base body. A sonotrode in the form of a rod-shaped flexural resonator is also possible. For example, the cross-section of the bending arm may taper with increasing distance from the base body. A free end of the bending arm may thus also be moved towards workpieces which are difficult to access without the strength of the bending arm being significantly impaired. So that the bending arm may vibrate freely, it should not touch the sonotrode carrier. In other words, it is possible that the sonotrode touches the sonotrode carrier in the vibrating state, i.e. during welding operation, exclusively with its base body. During welding operation, the bending arm may touch a workpiece to be welded only with its free end.

For example, the flexural resonator may comprise two bending arms which project from the base body in opposite directions to one another.

According to one embodiment, the processing of the contact face of the sonotrode and/or the sonotrode carrier may comprise a laser treatment, mechanical processing by blasting with a blasting agent or a combination of the two. The processing of the sonotrode or of the sonotrode carrier may thus be performed particularly precisely. By means of a laser treatment, the relevant contact face may, for example, be melted in a punctiform manner at several points with laser pulses. Microscopically small elevations may be formed in this case at the relevant points as a function of the selected laser parameters, which small elevations have the action of a micro-toothing. For example, by means of a laser treatment, a precise striped pattern composed of several stripe-shaped roughened sections may be generated (see further above). Ring-shaped and/or ring segment-shaped patterns are, however, also conceivable, for example, patterns composed of several concentric rings and/or concentric ring segments. For example, glass pearls or sand are suitable as blasting agents. Other blasting agents are also possible.

It should also be pointed out that possible features and advantages of embodiments of the invention are explained above and below partially with reference to an ultrasonic welding device, partially with reference to a method for producing a correspondingly adapted sonotrode of the ultrasonic welding device and partially with reference to a method for producing a correspondingly adapted sonotrode carrier of the ultrasonic welding device. A person skilled in the art will recognize that the features described for the individual embodiments may, in an analogous and suitable manner, be transferred and/or adjusted to other embodiments and/or be exchanged in order to arrive at further embodiments of the invention and possibly synergistic effects.

BRIEF DESCRIPTION OF THE DRAWINGS

Advantageous embodiments of the invention are explained in greater detail below with reference to the enclosed drawings, wherein neither the drawings nor the explanations are to be interpreted as restricting the invention in any manner.

The figures are purely schematic and not true to scale. Identical reference numbers designate identical features or features with an identical action in the various drawings.

DETAILED DESCRIPTION

Figure 1:
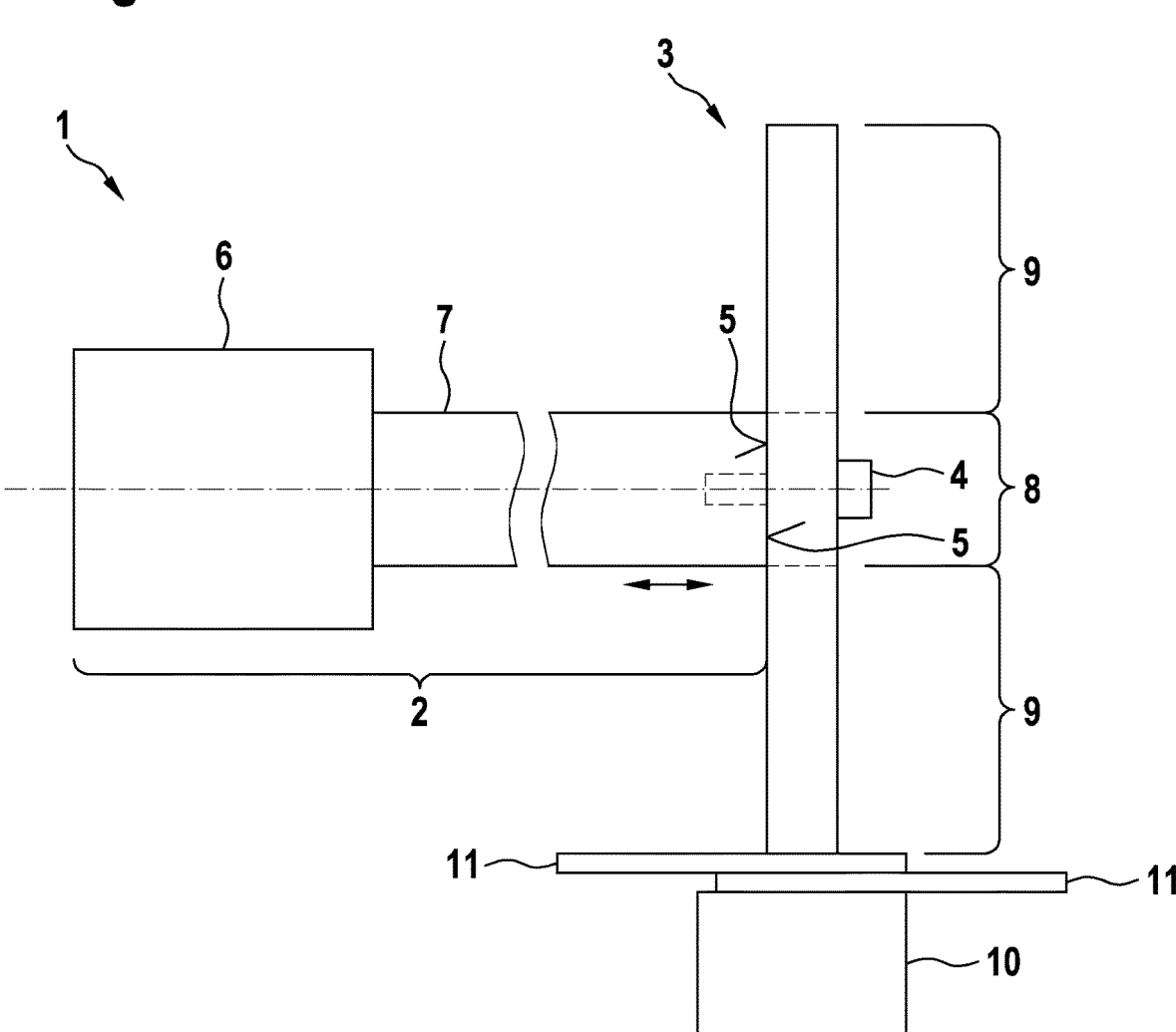
FIG. 1 shows an ultrasonic welding device according to one embodiment of the invention.

FIG. 1 shows an ultrasonic welding device 1 comprising a sonotrode carrier 2 and a sonotrode 3, ultrasound vibrations of which may be caused by means of the sonotrode carrier 2 (a vibration direction of the sonotrode carrier 2 is marked by a double arrow). The sonotrode 3 is attached exchangeably to the sonotrode carrier 2, here via a screw 4 at a free end of the sonotrode carrier 2. The sonotrode 3 and the sonotrode carrier 2 have in each case a contact face 5 at which they mutually contact one another.

The two contact faces 5 may be pushed against one another with a defined clamping force via the screw 4.

At least one of the two contact faces 5 is roughened at least in sections. The frictional connection between the two contact faces 5 may thus be improved.

The sonotrode carrier 2 may comprise a converter 6 for converting a high-frequency electric voltage into mechanical ultrasound vibrations and a booster 7 for transmitting the ultrasonic vibrations to the sonotrode 3. The booster 7 may be formed to change the amplitude of the ultrasonic vibrations in a suitable manner. The sonotrode 3 may correspondingly be fastened to a free end of the booster 7. A fastening of the sonotrode 3 to the converter 6 is also possible. In this case, the booster 7 may be dispensed with. The sonotrode carrier 2 may additionally comprise a generator for providing the electric voltage.

In this example, the sonotrode 3 is embodied as a flexural resonator which comprises a base body 8 and two bending arms 9 which project from the base body 8 in opposite directions to one another. However, a sonotrode 3 with only one bending arm 9 is also possible. The sonotrode 3 is fastened to the sonotrode carrier 2 via the base body 8 and touches it exclusively at the base body 8. The contact face 5 of the sonotrode 3 is thus provided by the base body 8.

By way of example, two plate-shaped workpieces 11 which partially overlap are arranged between a free end of one of the bending arms 9 and an anvil 10. The two workpieces 11 are welded to one another by the vibrating sonotrode 3.

In contrast to the representation shown in FIG. 1, the anvil 10 may alternatively be formed at least partially by at least one of the workpieces 11 themselves.

Figure 2:
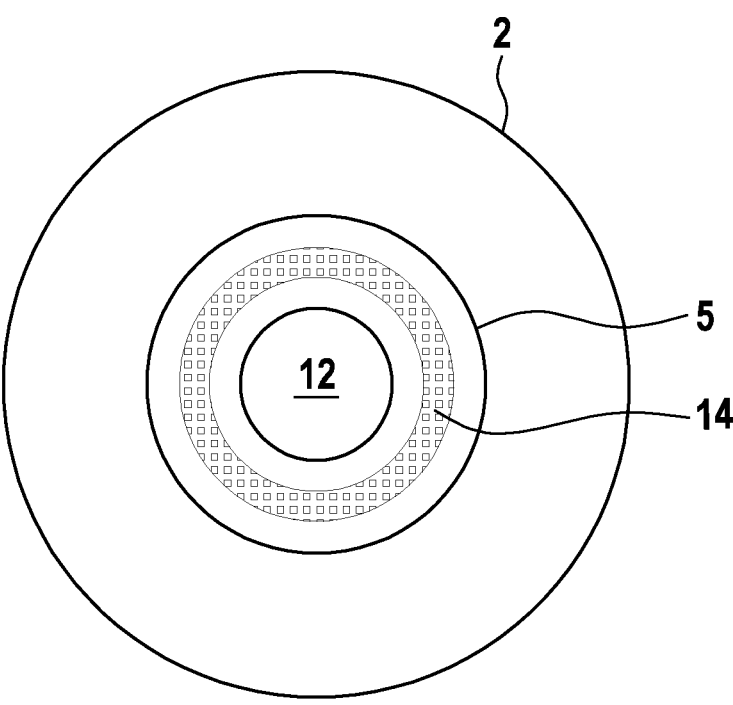
FIG. 2 shows a sonotrode carrier of an ultrasonic welding device according to one embodiment of the invention in plan view.

As may be seen in FIG. 2, it is possible that the contact face 5 of the sonotrode carrier 2 has a central sonotrode carrier opening 12 into which the screw 4 may be screwed. The contact face 5 of the sonotrode carrier 2 may surround the sonotrode carrier opening 12, for example, in a ring-shaped manner.

The contact face 5 of the sonotrode 3 may correspondingly have a sonotrode opening 13 through which the screw 4 may be guided. The contact face 5 of the sonotrode 3 may likewise surround the sonotrode opening 13 in a ring-shaped manner (see FIG. 4).

The contact face 5 of the sonotrode carrier 2 may comprise a roughened section 14, the roughness of which is significantly greater than in the remaining contact face 5.

For example, the roughened section 14 may have a mean roughness depth $R_z$ between 2.0 µm and 14 µm.

Additionally or alternatively, the roughened section 14 may have, for example, an arithmetical mean roughness value $R_a$ between 0.3 µm and 3.0 µm.

The roughened section 14 may surround the sonotrode carrier opening 12 in a similar manner to the contact face 5 in a ring-shaped manner. An arrangement of one or more ring segment-shaped, roughened sections 14, as in FIG. 4 using the example of the sonotrode, is, however, also possible. An arrangement of several concentric ring-shaped and/or ring segment-shaped roughened sections 14 is likewise conceivable.

The roughened section 14 or the roughened sections 14 may be smaller overall in terms of surface area than the respective contact face 5 or just as large as the respective contact face 5, i.e. the entire contact face 5 may also be roughened.

Figure 3:
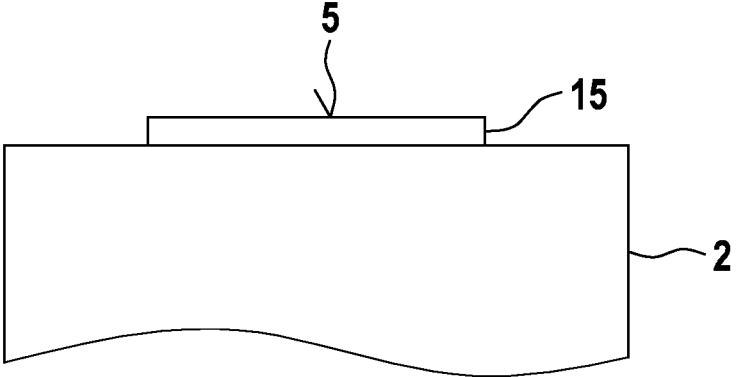
FIG. 3 shows a side view of the sonotrode carrier.

It is possible that the contact face 5 of the sonotrode carrier 2 is formed by a planar elevation 15 at the face side of the sonotrode carrier 2, as shown in FIG. 3. For example, it is thus possible to prevent the bending arms 9 from being contacted by the sonotrode carrier 2 in the vibrating state.

Figure 4:
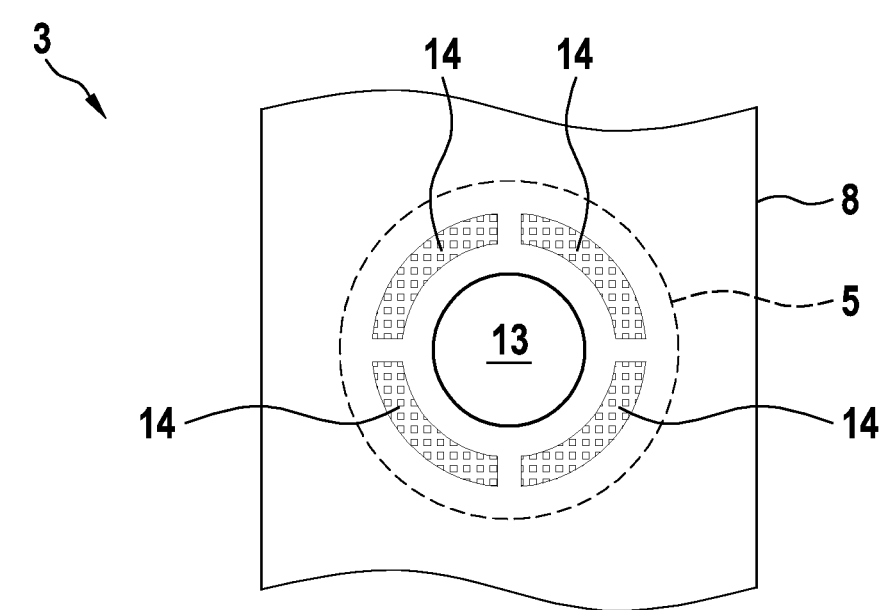
FIG. 4 shows a section of a sonotrode, which may be screwed once, of an ultrasonic welding device according to one embodiment of the invention.
Figure 5:
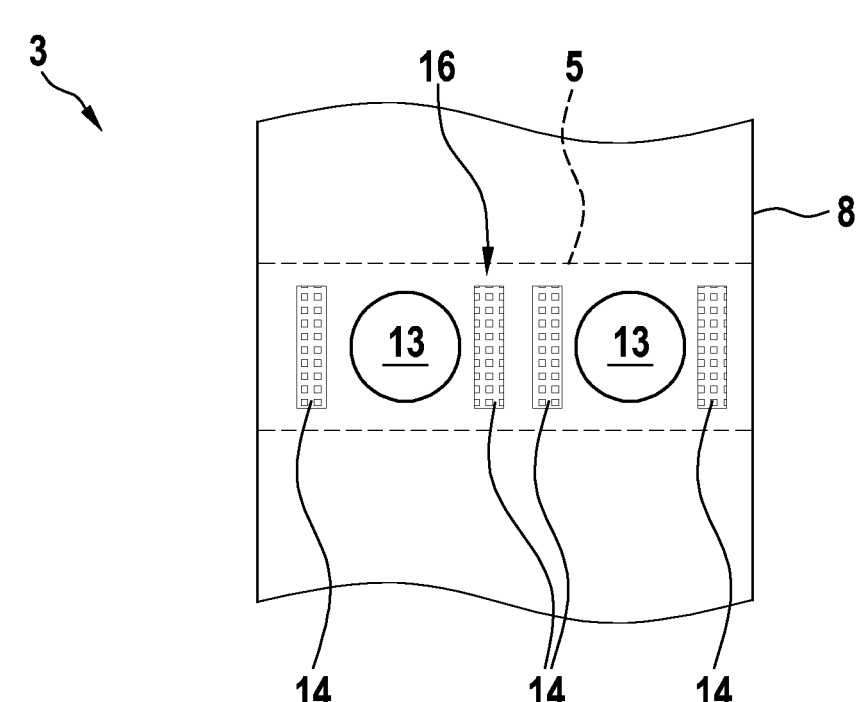
FIG. 5 shows a section of a sonotrode, which may screwed twice, of an ultrasonic welding device according to one embodiment of the invention.
Figure 6:
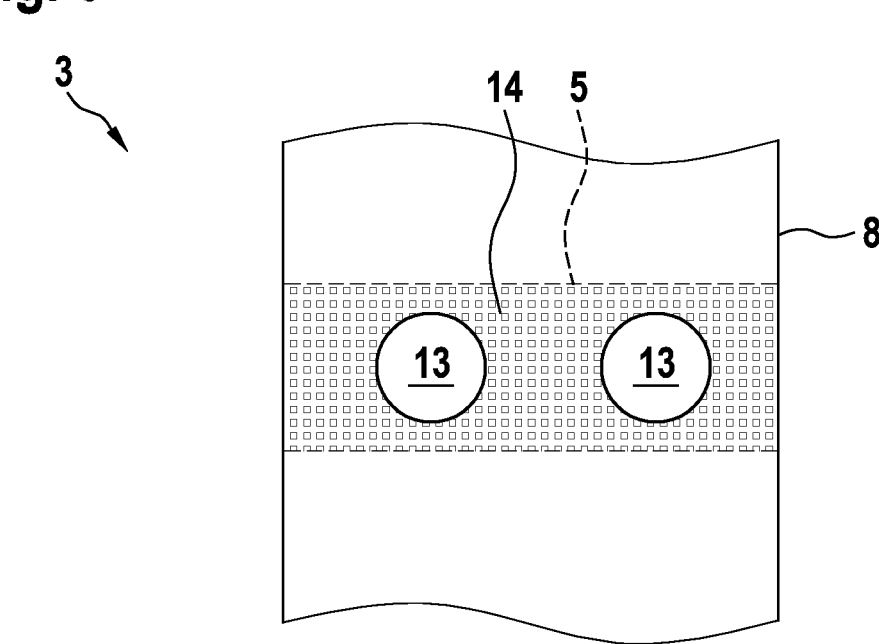
FIG. 6 shows a section of a sonotrode, which may screwed twice, of an ultrasonic welding device according to a further embodiment of the invention.

In contrast to the embodiments shown in FIG. 4, FIG. 5 and FIG. 6, alternatively or additionally, the sonotrode 3, for example, its base body 8, may preferably be embodied with such a planar elevation.

Alternatively or in addition to the sonotrode carrier 2, the contact face 5 of the sonotrode 3 may be correspondingly roughened at least in sections. FIG. 4 shows an example of a sonotrode 3 with four ring segment-shaped, roughened sections 14 within the contact face 5 of the sonotrode 3.

A striped pattern 16 with several stripe-shaped roughened sections 14, as may be seen in FIG. 5, is also possible. The sections 14 of the striped pattern 16 are here by way of example arranged oriented parallel to one another and distributed over the width of a rectangular contact face 5 of the sonotrode 3. Striped patterns 16, the sections 14 of which are oriented in different directions, for example, in orthogonal directions to one another are, however, also possible.

Moreover, the contact face 5 has in this example two sonotrode openings 13 to receive in each case a screw 4 (the sonotrode carrier 2 may correspondingly also have two sonotrode carrier openings 12). Here, at least one of the sections 14 of the striped pattern 16 may lie between the sonotrode openings 13 and/or at least one of the sonotrode openings 13 may lie between two sections 14 of the striped pattern 16.

Alternatively, the entire contact face 5 of the sonotrode 3 may be roughened (see FIG. 6).

It should be pointed out that the examples described above with reference to the sonotrode 3 for a roughened contact face 5 may correspondingly apply to the sonotrode carrier 2 and vice versa.

During mounting, the sonotrode 3 may be fixedly screwed on the sonotrode carrier 2 with a defined tightening torque so that the contact faces 5 fully contact one another and remain in contact during welding operation.

The contact face 5 of the sonotrode 3 and/or of the sonotrode carrier 2 may, for example, be machined, preferably by grinding or milling.

If the sonotrode 3, as is often the case, is made of a harder material than the sonotrode carrier 2, a friction-increasing structure which comprises one or more roughened sections 14 should be generated on the sonotrode 3. The penetration of the structure into the (softer) sonotrode carrier 2 is thus simplified. The reverse case is, however, also possible. The structure may be renewed practically simultaneously by replacing the sonotrode 3, which is conventionally a wearing part.

If the sonotrode carrier 2 has a similar hardness to the sonotrode 3, the structure may be generated, for example, by laser treatment at the sonotrode 3, as a result of which the hardness of the sonotrode 3 is locally increased.

The structure should be embodied so that a uniform pressure profile at the contact faces 5 is produced. The structure should furthermore be embodied so that the sonotrode 3 remains adequately connected to the contact face 5 of the sonotrode carrier 2 in the vibrating state. A structure which is suitable in this sense may be generated by blasting, lasering and/or erosion of one or both contact faces 5.

It should finally be pointed out that terms such as "having", "comprising", etc. do not exclude any other elements or steps and indefinite articles such as "a" do not rule out a plurality. It should furthermore be pointed out that features or steps which have been described with reference to one of the above embodiments may also be used in combination with features or steps which have been described with reference to others of the above embodiments. Reference numbers in the claims should not be regarded as a restriction.

LIST OF REFERENCE NUMBERS

1 Ultrasonic welding device
2 Sonotrode carrier
3 Sonotrode
4 Screw
Contact face
6 Converter
7 Booster
8 Base body
9 Bending arm
10 Anvil
11 Workpiece
12 Sonotrode carrier opening
13 Sonotrode opening
14 Roughened section
15 Planar elevation
16 Striped pattern

The invention claimed is:

1. An ultrasonic welding device, comprising:
a sonotrode; and
a sonotrode carrier which is formed to cause ultrasonic vibrations of the sonotrode;
wherein the sonotrode and the sonotrode carrier have in each case a contact face and at least one of the contact faces is roughened at least in sections, and the sonotrode is fastened exchangeably to the sonotrode carrier in such a manner that the contact faces are pushed against one another;
wherein a roughened section of the least one contact face roughened at least in sections has a mean roughness depth $R_z$ of at least 2.0 μm and/or an arithmetical mean roughness value $R_a$ of at least 0.3 μm; wherein the mean roughness depth $R_z$ is at most 14 μm and/or wherein the arithmetical mean roughness value $R_a$ is at most 3.0 μm;
wherein the sonotrode is embodied as a flexural resonator which comprises a base body and at least one bending arm which projects from the base body; and
wherein the sonotrode is fastened exchangeably to the sonotrode carrier via the base body and the base body comprises the contact face of the sonotrode.

2. The ultrasonic welding device according to claim 1, wherein the sonotrode is fastened exchangeably to the sonotrode carrier via at least one screw.

3. The ultrasonic welding device according to claim 2, wherein at least one of the following conditions applies:
(i) the at least one screw is introduced into a sonotrode opening in the sonotrode and the sonotrode opening is surrounded at least partially by the contact face of the sonotrode;
(ii) the at least one screw is introduced into a sonotrode carrier opening in the sonotrode carrier and the sonotrode carrier opening is surrounded at least partially by the contact face of the sonotrode carrier.

4. The ultrasonic welding device according to claim 3, wherein at least one of the following conditions applies:
(i) the sonotrode opening is surrounded in a ring-shaped and/or ring segment-shaped manner by the contact face of the sonotrode;
(ii) the sonotrode carrier opening is surrounded in a ring-shaped and/or ring segment-shaped manner by the contact face of the sonotrode carrier.

5. The ultrasonic welding device according to claim 3, wherein at least one of the following conditions applies:
(i) the sonotrode opening is surrounded by at least one ring-shaped and/or ring segment-shaped roughened section of the contact face of the sonotrode;
(ii) the sonotrode carrier opening is surrounded by at least one ring-shaped and/or ring segment-shaped roughened section of the contact face of the sonotrode carrier.

6. The ultrasonic welding device according to claim 1, wherein at least one of the contact faces comprises a striped pattern composed of several stripe-shaped roughened sections.

7. The ultrasonic welding device according to claim 6, wherein the roughened sections of the striped pattern are arranged parallel to one another.

8. A method for producing the sonotrode for the ultrasonic welding device according to claim 1, wherein the method comprises:
providing the sonotrode in a state to be processed;
and processing the sonotrode in order to roughen the contact face of the sonotrode at least in sections,
wherein a roughened section of the contact face of the sonotrode roughened at least in sections has a mean roughness depth $R_z$ of at least 2.0 μm and/or an arithmetical mean roughness value $R_a$ of at least 0.3 μm; and
wherein the mean roughness depth $R_z$ is at most 14 μm; and/or wherein the arithmetical mean roughness value $R_a$ is at most 3.0 μm.

9. A method for producing the sonotrode carrier for the ultrasonic welding device according to claim 1, wherein the method comprises:
providing the sonotrode carrier in a state to be processed, wherein the sonotrode carrier is configured for generating ultrasonic vibrations in a sonotrode;
and processing the sonotrode carrier in order to roughen the contact face of the sonotrode carrier at least in sections, wherein a roughened section of the contact face of the sonotrode carrier roughened at least in sections has a mean roughness depth $R_z$ of at least 2.0 μm and/or an arithmetical mean roughness value $R_a$ of at least 0.3 μm; and
wherein the mean roughness depth $R_z$ is at most 14 μm; and/or wherein the arithmetical mean roughness value $R_a$ is at most 3.0 μm.

10. The method according claim 8,
wherein the processing comprises laser treatment and/or
mechanical processing by blasting with a blasting
agent.

11. The method according claim 9,
wherein the processing comprises laser treatment and/or
mechanical processing by blasting with a blasting
agent.

* * * * *